United States Patent [19]

Vanden Bossche

[11] 3,937,305

[45] Feb. 10, 1976

[54] DISC BRAKE SHOE DAMPENER, METHOD OF MAKING SAME

[75] Inventor: Daniel Julius Vanden Bossche, Frazer, Mich.

[73] Assignee: Chrysler Corporation, Highland Park, Mich.

[22] Filed: Oct. 3, 1974

[21] Appl. No.: 511,839

[52] U.S. Cl. ............... 188/73.5; 29/446; 188/1 B; 228/113; 228/136
[51] Int. Cl.² ............... F16D 55/00; F16D 65/00
[58] Field of Search ...... 188/1 B, 73.3, 73.5, 250 E; 29/446, 475, 480, 484, 470.3; 228/113, 136

[56] References Cited
UNITED STATES PATENTS

| | | | |
|---|---|---|---|
| 3,113,640 | 12/1963 | Stedman | 188/1 B |
| 3,378,116 | 4/1968 | Hennig | 188/1 B |
| 3,388,772 | 6/1968 | Marsh et al. | 188/1 B |
| 3,410,369 | 11/1968 | Ishizuka | 188/1 B |
| 3,460,652 | 8/1969 | Botterill | 188/73.5 |
| 3,720,293 | 3/1973 | Hikida et al. | 188/1 B X |
| 3,722,634 | 3/1973 | Ogasawara et al. | 188/1 B X |
| 3,730,302 | 5/1973 | Ogawa et al. | 188/1 B X |

*Primary Examiner*—C. W. Lanham
*Assistant Examiner*—Joseph A. Walkowski
*Attorney, Agent, or Firm*—Talburtt & Baldwin

[57] ABSTRACT

Disc brake backing plate with a cup-shaped housing having in one embodiment a weight sandwiched between two resilient plugs and in a second embodiment, a plurality of scrap punch metal particles mixed with and incorporated in a resilient carrier.

3 Claims, 11 Drawing Figures

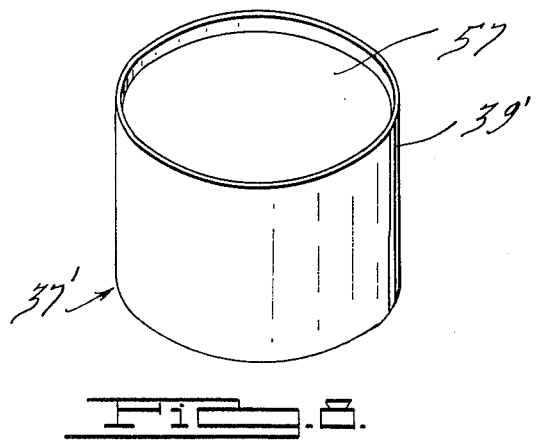
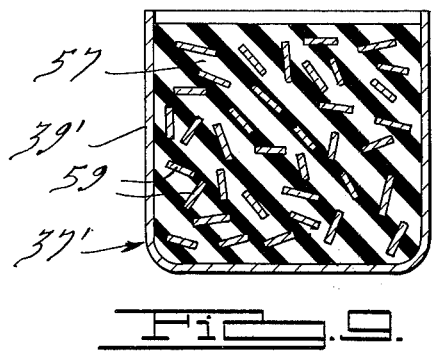
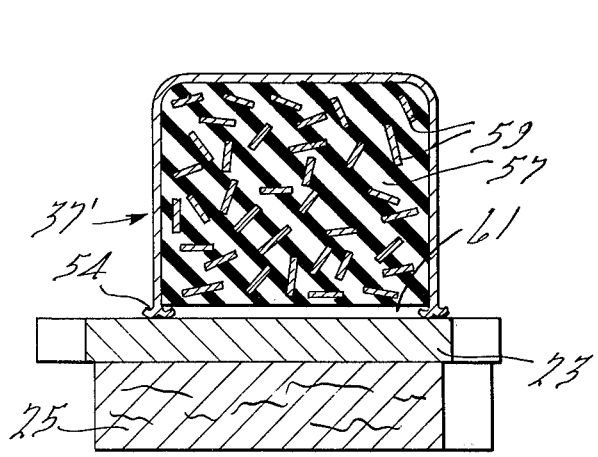
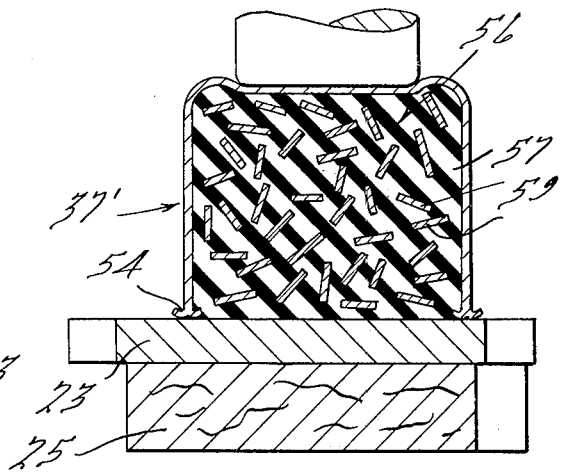

DISC BRAKE SHOE DAMPENER, METHOD OF MAKING SAME

BACKGROUND OF THE INVENTION

The present invention relates to disc brakes and more particularly to apparatus for limiting the squealing noise of caliper-type disc brakes and a method of making such apparatus.

It is well known that when automobile disc brakes are applied lightly at relatively low speeds some caliper disc brakes emit a high pitched squeal which is objectionable. This squeal is due to various reasons, but it is believed to be due primarily to the vibration of the shoes against the discs and the pins or supports on which the shoes rest. Various means have been employed to inhibit this squealing noise. For example, a glue or pad has been applied to the shoes to provide a resilient dampener between the shoes and the backing fingers of the caliper. Another method includes the use of metal springs between the shoes and the backing fingers of the caliper to keep the shoes away from the fingers. Even metal linings have been attached to the shoes on the backside thereof to inhibit the squealing noise. The present invention relates to novel apparatus for reducing the squeal of disc brakes when applied at relatively low speeds and to a method of manufacturing such apparatus.

BRIEF SUMMARY OF THE INVENTION

Briefly, this invention comprises a dampener that could be attached to a brake shoe backing plate and a method of manufacturing such dampener and brake shoe backing plate.

One of the primary objects of the invention is to provide means for reducing undesirable squealing noises associated with a caliper-type disc brake and a method of making such means for reducing such squealing noises.

Another object of this invention is to provide a dampening device which reduces the vibrations of a brake shoe of a caliper-type disc brake device.

A further object of this invention is to provide a dampening device which includes a resiliently mounted mass for reducing the vibrations of a disc brake shoe and backing plate associated therewith.

Still another object of this invention is to provide a method of manufacturing a dampening device and brake shoe.

A further object of this invention is to provide an anti-squealing device which is economical is construction and efficient in operation.

Other objects and advantages of this invention will be made apparent as the description progresses.

A BRIEF DESCRIPTION OF THE DRAWINGS

In the accompanying drawings in which two of various possible embodiments of this invention are illustrated:

FIG. 8 is a perspective of a second embodiment of this invention;

FIG. 9 is a vertical section of the embodiment shown in FIG. 8;

FIG. 10 is a section similar to FIG. 5 showing the FIG. 8 embodiment subsequent to a welding step in the method of manufacturing the device; and FIG. 11 is a view similar to FIG. 10 showing another step in the method of manufacturing the device.

Like parts are shown by corresponding reference numerals throughout the drawings.

DESCRIPTION OF THE PREFERRED EMBODIMENTS

Figure 1:
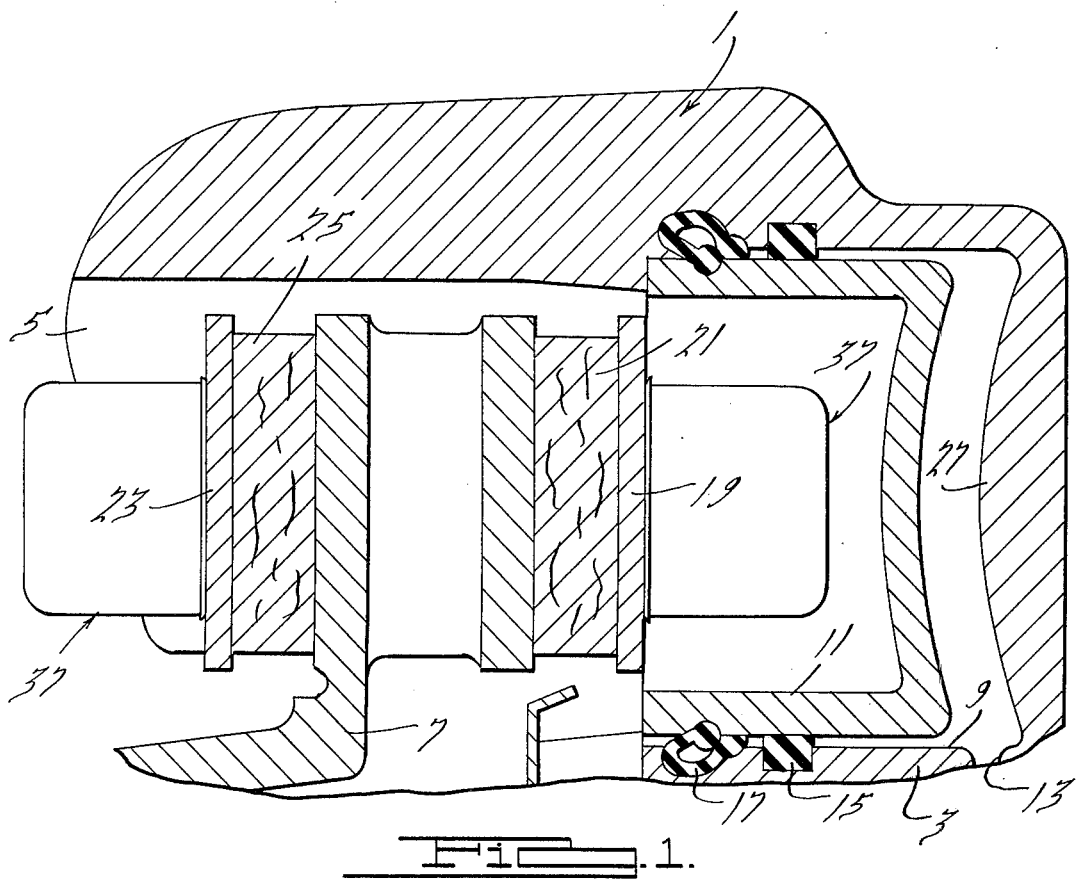
FIG. 1 is a section taken through the disc brake caliper assembly and disc and includes one embodiment of a dampening device of this invention attached to the brake shoes.

Referring now to the drawings, a caliper of a conventional disc brake assembly is illustrated at 1 in FIG. 1. Caliper 1 includes a cylindrical portion 3 and a pair of backing fingers 5 located on opposite sides of a rotatable disc 7. The upper portion of the caliper 1 straddles the disc 7.

Cylinder portion 3 has a bore 9 therein which contains a hollow piston 11 adapted to be moved toward the disc 7 by the admission of hydraulic fluid under pressure through an inlet 13, a seal 15 prevents the escape of hydraulic fluid from the cylinder and a boot 17 inhibits the ingress of dust and other particles into the bore 9. A piston engages a backing plate 19 to which is secured a shoe, pad or lining 21. The backing fingers 5 also engage a backing plate 23 to which is secured a lining or pad 25.

Figure 2:
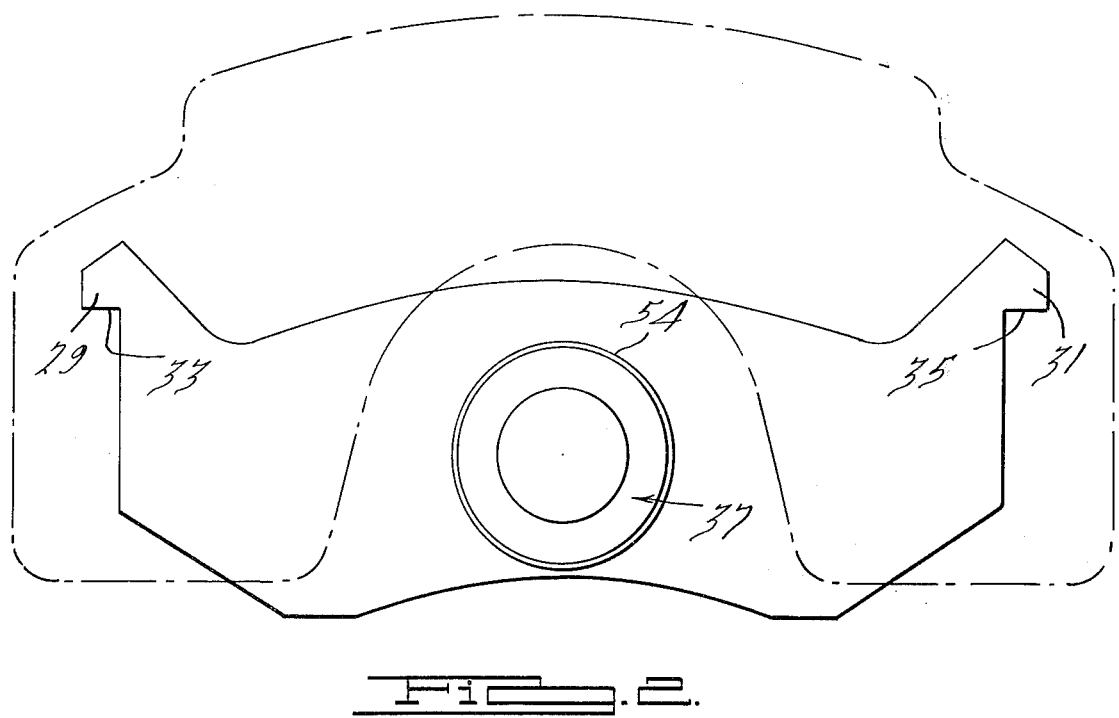
FIG. 2 is an elevational view looking from the left side of FIG. 1 with the caliper assembly being shown in broken lines.
Figure 3:
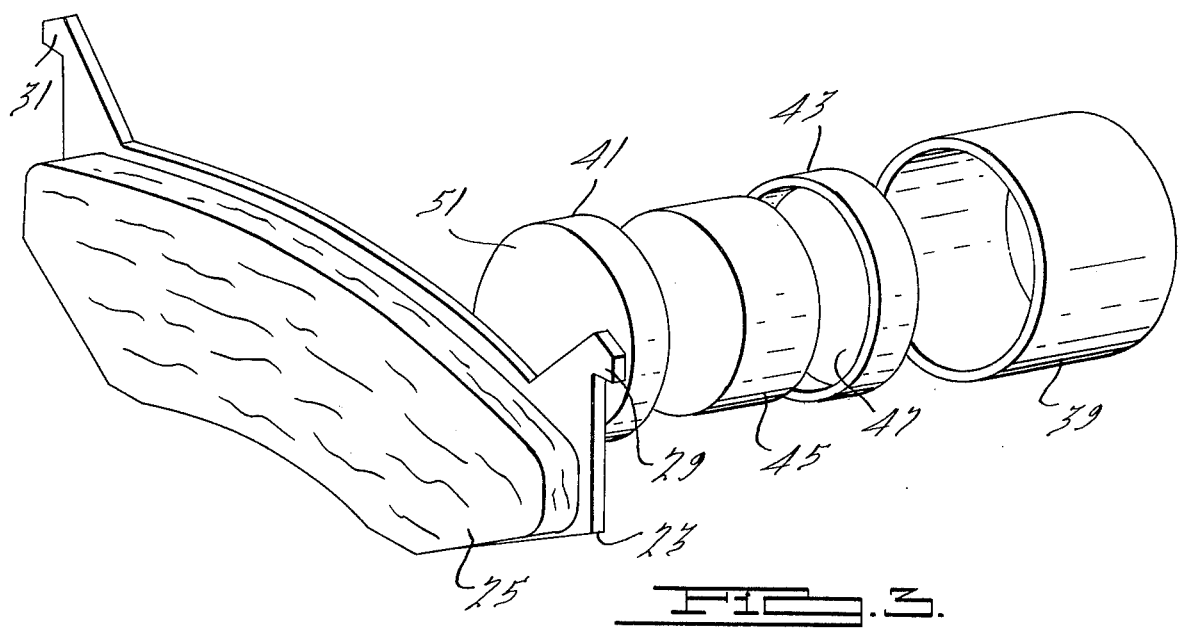
FIG. 3 is an exploded view of a disc brake shoe and dampener.

When fluid is admitted to the bore 9 through inlet 13 the piston 11 and the caliper end wall 27 are forced apart and cause the shoes 19 and 23 and the linings 21 and 25 connected thereto to be forced toward the disc 7 to frictionally engage and brake the same. The shoes 19 and 23 include arms 29 and 31 (FIG. 2) which ridge on ledges or shoulders 33 and 35 of the caliper 1.

As mentioned previously when the linings or pads 21 and 25 engage the disc 7 during braking at a relaively slow speed, a vibration is set up due to the engagement of the pads with the disc and the engagement of the backing plates 19 and 23 with the piston 11 and the fingers 5 respectively which produces a squeal that can be objectionable. It has been recognized that dampening devices may be utilized for preventing objectionable vibrations of many components. For example, a dampening device is sometimes used on the body pan of an automotive vehicle for preventing undue vibrations and noise associated therewith. The present invention utilizes a particular form of dampening device and a particular method of manufacturing the same which will now be discussed. The dampeners are illustrated at 37 and each includes a cup-shaped housing 39 in which are positioned two rubber plugs 41 and 43 which sandwich a weight 45 therebetween. The rubber plugs 41 and 43 are cylindrical in shape and include a recess 47 with an annullar upstanding rim or lip 49. The recesses and lips facilitate the positioning of the weight 45 between the plugs 41 and 43.

Figure 4:
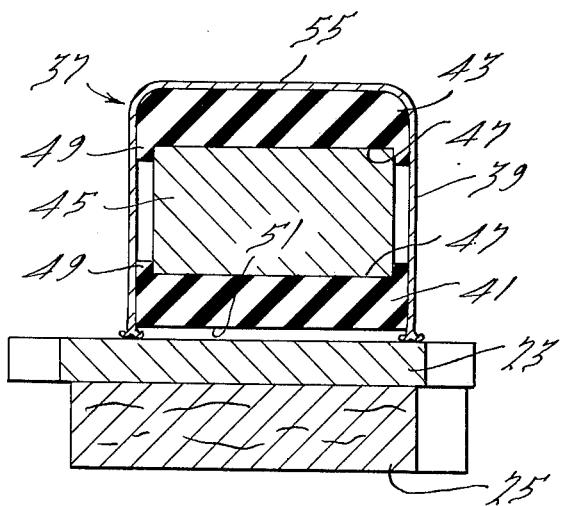
FIGS. 4–7 are sections showing various steps in a method of manufacturing a shoe and dempening device of this invention.
Figure 5:
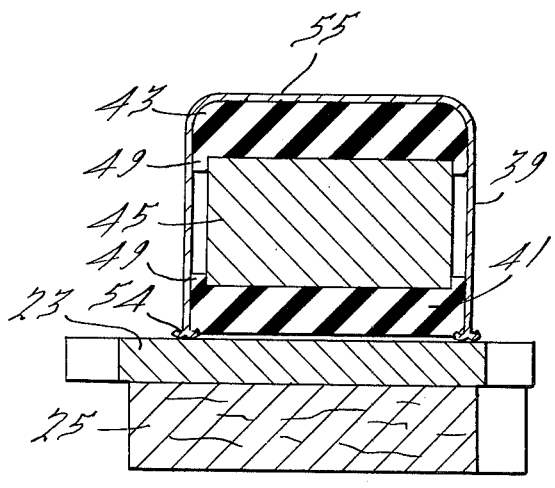
Figure 6:
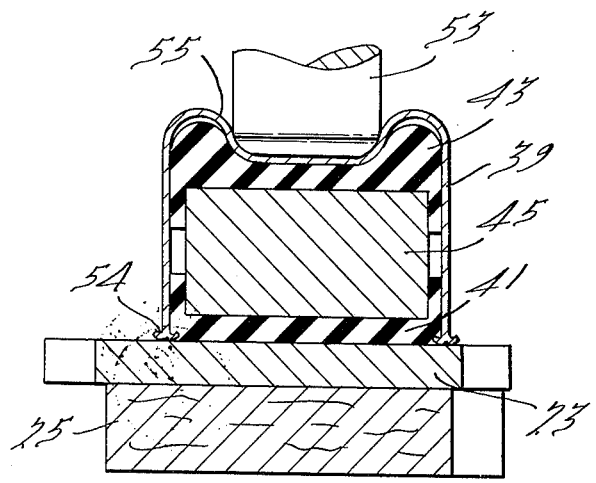
Figure 7:
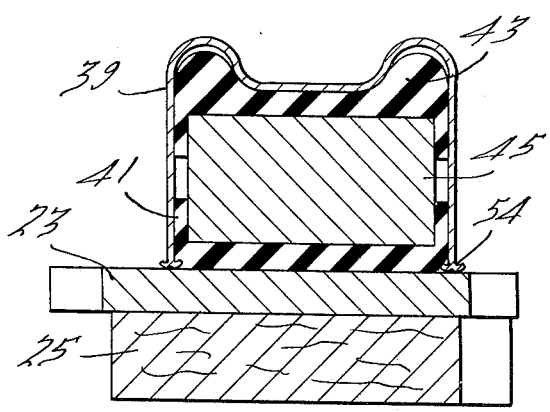

The dampener 37 is assembled in the following manner: First, the plug 43, weight 45 and plug 41 are assembled in the cup 39 with the plug 43 adjacent to the bottom of the cup. It will be noted that the flat face 51 of Plug 41 is spaced inwardly from the outer edge of the cup 39 (FIG. 4). The cup with the assembled components therein is next inertia welded to the backing plates 19 and 23. The cup is welded to plate 19 in an area which is aligned with the interior of the hollow piston 11. An identical cup is welded to plate 23 in an area which will place the dampener between the two fingers 5 of the caliper 1. As the cup 39 is inertia welded to the backing plates the welding takes place at the lip in the area indicated at 54. The lip of the cup is brought up to a forging temperature during the inertia welding process and the face 51 of the plug 41 is forced against the backing plate to effect a solid state bond. The characteristics of inertia welding are well known.

Following the welding of the cup and the components therein to the backing plates a deforming die member 53 having a circular head thereon smaller than the diameter of the cup 39 is brought into contact with the bottom 55 of the cup 39. The die 53 forces the center portion of the bottom 55 of the cup 39 inwardly toward the shoe 19 or 23. This squeezes the plugs 41 and 43 together and the lip portions 49 thereof are forced around the weight 45 in the annular space between the weight and the annular wall of the cup 39. The weight 45 is thus securely attached to the backing plate 19 or 23, but is insulated from metallic contact with such backing plate by the plug 41 located between the weight 45 and the backing plate and the plug 43 located between the weight and the cup 39 which is metallically connected to the backing plate.

The second embodiment of this invention is illustrated in FIGS. 8–11 at 37'. The housing 39' is filled with a mixture 56 of a hardenable material or medium, such as polysulfide for example 57, and scrap metal punchings 59. The amount of metal punchings and polysulfide are of a sufficient quantity to perform the dampening function. The housing 39' is filled with the mixture to a level slightly below the lip of the cup is inverted and inertia welded to the backing plates 19 and 23. Care is taken to leave a small air space 61 adjacent the backing plate. A deforming die member 53 is forced against the bottom of the cup to compress the hardened mixture 56 against the backing plate. The air in space 61 is compressed and forced into the mixture as the die 53 is applied.

It has been found that this dampener 37 with the insulated weight 45 therein or the insulated metal punchings 59 therein is effective in eliminating the vibrations which often occur upon light braking applications. This then inhibits the generation of vibratory induced squealing noises.

In view of the foregoing it will be seen that the several objects of the invention are achieved.

While only one embodiment of the invention has been disclosed and described, it is apparent that other embodiments and modifications of the invention are possible.

I claim:

1. Disc brake vibration inhibiting apparatus for a disc brake shoe of the type comprising a pad and a backing plate, said vibration inhibiting apparatus including a cup-shaped metallic member having the lip thereof inertia-welded directly to the backing plate, weight means within said cup-shaped metallic member, resilient means surrounding said weight means and insulating the same from the walls and bottom of said cup-shaped member, the bottom of said cup-shaped metallic member being deformed inwardly towards said backing plate to cause said resilient means to be in a compressed condition.

2. Apparatus as set forth in claim 1 wherein said weight means comprises a plurality of metal punchings and said resilient means comprises a solidfied medium throught which said punchings are scattered.

3. Apparatus as set forth in claim 1 wherein said resilient means comprises first and second resilient members within said cup-shaped member, said first resilient member being adjacent the bottom of the cup and the second resilient member being adjacent to the backing plate, said weight means comprising a single weight sandwiched between said first and second resilient members, each of said resilient members being generally cylindrical and including a recessed portion surrounded by an angular lip, said lips facing one another in said cup-shaped member and surrounding the adjacent peripheral edge of said single weight.

* * * * *